United States Patent
Wimmers et al.

(10) Patent No.: US 10,345,456 B2
(45) Date of Patent: Jul. 9, 2019

(54) RADIATION DETECTOR AND METHOD FOR PRODUCING A RADIATION DETECTOR

(71) Applicant: KONINKLIJKE PHILIPS N.V., Eindhoven (NL)

(72) Inventors: Onno Jan Wimmers, Eindhoven (NL); Johannes Wilhelmus Maria Jacobs, Eindhoven (NL); Jacques Jules Van Oekel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 15 days.

(21) Appl. No.: 15/322,764

(22) PCT Filed: Jun. 1, 2015

(86) PCT No.: PCT/EP2015/062145
§ 371 (c)(1),
(2) Date: Dec. 29, 2016

(87) PCT Pub. No.: WO2016/000887
PCT Pub. Date: Jan. 7, 2016

(65) Prior Publication Data
US 2017/0139058 A1    May 18, 2017

(30) Foreign Application Priority Data
Jul. 3, 2014 (EP) ..................................... 14175582

(51) Int. Cl.
*G01T 1/20* (2006.01)
*B33Y 10/00* (2015.01)
(Continued)

(52) U.S. Cl.
CPC ............. *G01T 1/2018* (2013.01); *G01T 1/202* (2013.01); *B29C 64/112* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| 6,784,436 B2 | 8/2004 | Francke |
| 7,379,528 B2 | 5/2008 | Mattson |

(Continued)

FOREIGN PATENT DOCUMENTS

| EP | 2420861 A1 | 2/2012 |
| JP | H09325185 A | 12/1997 |

(Continued)

OTHER PUBLICATIONS

Hao, X. et al "Ink-Jet Printing of Ceramic Pillar Arrays", Journal of Materials Science, vol. 37, 2002, pp. 1987-1992.

(Continued)

*Primary Examiner* — Edwin C Gunberg
(74) *Attorney, Agent, or Firm* — Larry Liberchuk

(57) ABSTRACT

The present invention relates to a radiation detector device comprising a first array (120) of a plurality of columnar elements (125), wherein at least one of the columnar elements (125) comprises a base portion (126) and a protruding portion (127), and wherein at least one of the columnar elements (125) comprises a scintillating material and at least one of the columnar elements (125) is configured to generate a light ray by a radiation conversion; and a second array (130) of a plurality of photosensitive elements (135), wherein at least one of the photosensitive elements (135) is assigned to one of the columnar elements (125) and at least one of the photosensitive elements (135) is configured to (Continued)

detected the generated light ray and a read-out electronics circuit (150).

14 Claims, 2 Drawing Sheets

(51) Int. Cl.
*B33Y 80/00* (2015.01)
*G01T 1/202* (2006.01)
*B29C 64/112* (2017.01)

(56) References Cited

U.S. PATENT DOCUMENTS

| | | | |
|---|---|---|---|
| 7,405,408 | B2 | 7/2008 | Vogtmieir |
| 7,408,166 | B2 | 8/2008 | Schafer |
| 7,923,693 | B2 | 4/2011 | Faibis |
| 2004/0042585 | A1 | 3/2004 | Nagarkar |
| 2005/0089142 | A1 | 4/2005 | Marek |
| 2006/0131509 | A1 | 6/2006 | Matz |
| 2010/0264318 | A1 | 10/2010 | Faibis |
| 2011/0211668 | A1 | 9/2011 | Booker |
| 2014/0084167 | A1* | 3/2014 | Ohashi ............... G01T 1/202 250/361 R |
| 2014/0175295 | A1 | 6/2014 | Takei |

FOREIGN PATENT DOCUMENTS

| | | |
|---|---|---|
| JP | 2006058099 A | 3/2006 |
| JP | 2006184166 A | 7/2006 |
| JP | 2006284346 A | 10/2006 |
| JP | 2007240306 A | 9/2007 |
| JP | 2011027569 A | 2/2011 |
| JP | 2011133395 A | 7/2011 |
| JP | 2014169956 A | 9/2014 |
| WO | 2013015438 A2 | 1/2013 |

OTHER PUBLICATIONS

Mishnayot, Y. et al "Three-Dimensional Printing of Scintillating Materials", Review of Scientific Instruments, vol. 85, 2014.

Simon, Matthias et al "X-Ray Imaging Performance of Scintillator-Filled Silicon Pore Arrays", Med. Phys. vol. 35, No. 3, Mar. 2008.

Spahn, Martin "Flat Detectors and Their Clinical Applications", Eur. Radiology, vol. 15, 2005, pp. 1934-1947.

Gallet, Jacqueline et al "Image Capture Chain Performance of Kodak's Next Generation of Directview DR Systems", Kodak Medical Systems White Paper 2006.

Noguera, R. et al "3D tine scale ceramic components formed by ink-jet prototyping process", Journal European Ceraminic Society, vol. 25, Issue 12, 2005, pp. 2055-2059.

Lejeune, M. et al "Ink-Jet Printing of Ceramic Micro-Pillar Arrays", Science Direct, Journal of the European Ceramic Society, vol. 29, 2009, pp. 905-911.

* cited by examiner

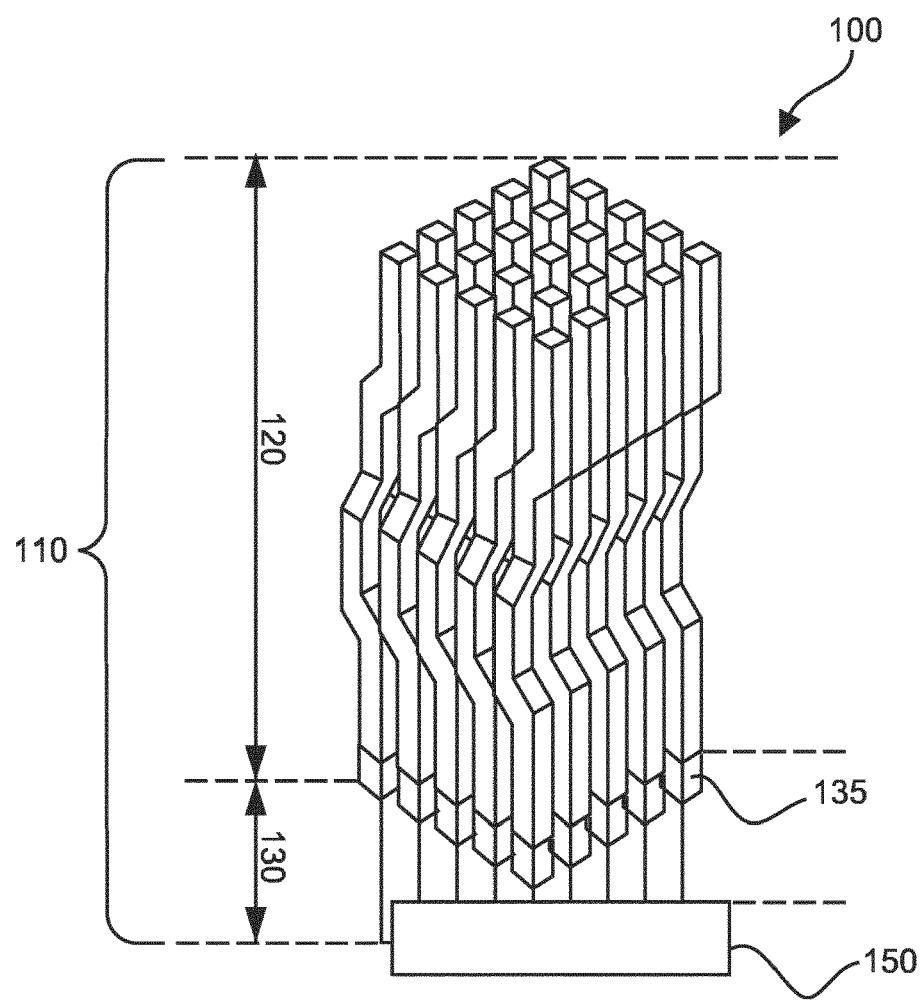
Fig. 1
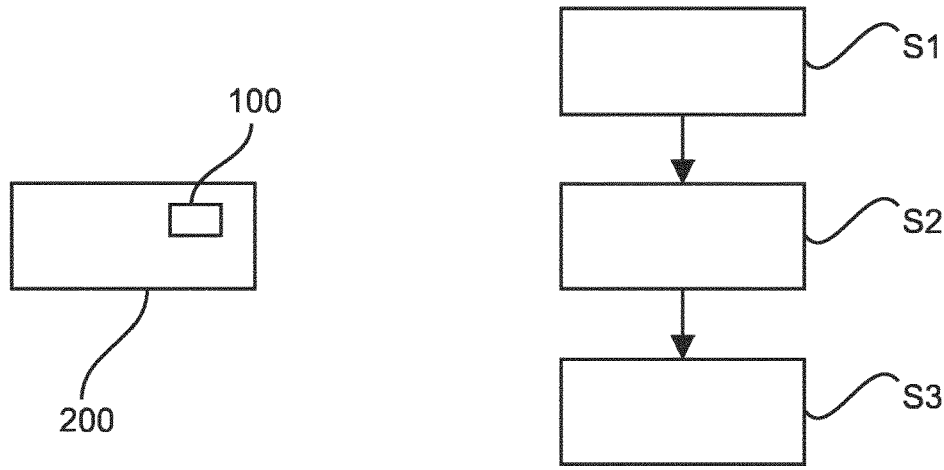
Fig. 2 Fig. 3

RADIATION DETECTOR AND METHOD FOR PRODUCING A RADIATION DETECTOR

CROSS-REFERENCE TO PRIOR APPLICATIONS

This application is the U.S. National Phase application under 35 U.S.C. § 371 of International Application No. PCT/EP2015/062145, filed on Jun. 1, 2015, which claims the benefit of European Patent Application No. 14175582.7, filed on Jul. 3, 2014. These applications are hereby incorporated by reference herein.

FIELD OF THE INVENTION

The present invention relates to radiation detectors. In particular, the present invention relates to a radiation detector device, a medical imaging system and a method for producing a radiation detector device.

BACKGROUND OF THE INVENTION

In the field of flat X-ray detectors, the way to obtain sharp images, i.e. a high or an improved optical transfer function or a high or an improved modulation transfer function, when using thick scintillator layers is pixilation. The most applied scintillator, CsI:Tl, Thallium doped Caesium Iodide, is pixelated by giving it a needle-shape, micro columnar structure, during the thermal evaporation deposition, typical dimensions are a needle diameter of 7 µm and a needle height of up to 600 µm.

For other scintillator materials, pixilation by separating the individual scintillator pixels with a reflective material is known, but for the flat X-ray detector application requiring a pixel height to width ratio of 5 or more, this is not applicable.

US 2004 004 258 5 A1 relates to a method of fabricating an apparatus for an enhanced imaging sensor consisting of pixelated micro columnar scintillation film material for X-ray imaging comprising a scintillation substrate and a micro columnar scintillation film material in contact with the scintillation substrate.

US 2010 026 431 8 A1 describes scintillator-elements for use in X-ray detectors, the elements being shaped to ensure maximum absorption of the energy carried in by X-ray photons and to provide high position-resolution. Arrangements of such scintillator-elements in arrays and detector-systems comprising a plurality of arrays are described.

US 2011/0211668 A1 relates to a converter element for a radiation detector, which comprises at least two conversion cells that are at least partially separated from each other by intermediate separation walls which affect the spreading of electrical signals generated by incident radiation.

US 20050089142 A1 describes scintillator coatings having predetermined barrier protection, light transmission, and light reflection properties. These scintillators comprise: a scintillator material comprising a barrier coating disposed thereon, wherein the barrier coating: provides barrier protection to the scintillator material, is capable of transmitting light there through, and is capable of reflecting light back into the scintillator material.

WO 2013/015438 A2 describes a scintillator comprising multiple columnar portions which are stacked in a state in which end faces of the multiple columnar portions are partly offset with respect to each other.

US 2014/0175295 A1 describes a scintillator comprising a scintillator layer including a plurality of columnar crystals configured to convert radiation into light, and a covering layer configured to cover the scintillator layer, wherein the scintillator layer includes a protrusion. The protrusions are typically an abnormally growing portion generated by abnormal growth when the plurality of columnar crystals grow.

SUMMARY OF THE INVENTION

There may be a need to improve X-ray detectors and scintillator structures.

These needs are met by the subject matter of the independent claims. Further advantages will become apparent from the following description of exemplary embodiments and from the dependent claims.

An aspect of the present invention relates to a radiation detector device comprising: a first array of a plurality of single piece columnar elements, comprising a base portion and a protruding portion, the columnar elements comprising a scintillating material configured to generate a light ray by a radiation conversion, wherein the columnar elements comprise as the protruding portion a stepwise displacement along a longitudinal direction of the columnar element; and a second array of a plurality of photosensitive elements, assigned to the columnar elements and the photosensitive elements being configured to detect the generated light ray; and a read-out electronics circuit.

A further aspect of the present invention relates to a medical imaging system comprising a device according to the second aspect or according to any exemplary embodiment of the second aspect.

A further aspect of the present invention relates to a method for producing a radiation detector device, in particular to an additive manufacturing method, comprising the steps of: Preparing a first array of a plurality of single piece columnar elements wherein the columnar elements comprise a protruding portion having a stepwise displacement along a longitudinal direction of the columnar element; preparing a second array of a plurality of photosensitive elements; and constructing a scintillator structure comprising the first array and the second array.

The present invention is based on the fact that additive manufacturing technologies provide further methods for manufacturing needle structures for columnar scintillator structures. The scintillator structure for the radiation detector device may be producible by an additive manufacturing method.

These columnar scintillator structures can be made through layer by layer consecutive deposition techniques of small entities, for instance of small droplets through ink-jet printing or thin structured layers through lithographic methods. These techniques in combination with columnar scintillating elements comprising a protruding part have the advantages that the scintillator structure has a fill-factor of more than 90%, for incident radiation, in which case the detector is able to cover the entire surface when seen from above.

The term fill-factor as used by the present invention may refer to a factor of an image or radiation detector and represents the ratio of a detector's light sensitive area to its total area.

The present invention advantageously provides a scintillator structure that can be made in a needle-like or columnar structure which has a very high efficiency to guide light generated by an X-ray or γ-ray conversion event to the bottom of the columnar element where the light ray will be detected by a thereto attached or assigned photosensitive element.

The present invention advantageously provides that for the scintillator structure other scintillating materials than CsI:Tl, Thallium doped Caesium Iodide, can be used in the needle-like structure, combining a thick—thicker compared to other layers using such a scintillating material but not having a columnar shape—layer give a high—higher compared to other sensors using such a scintillating material but not having a columnar shape—light output with a high image resolution to obtain a high image quality of the radiation detector.

The present invention advantageously allows providing scintillator structures that can be made using these materials giving both an improved image quality performance as well as having a good resistance to moisture. The latter avoids the elaborate moisture prevention measures which are necessary when employing hydroscopic CsI:Tl.

The present invention further advantageously provides the use of new scintillator materials optimized for specific application requirements such as increased reliability at elevated temperatures or increased robustness against mechanical friction.

The present invention advantageously provides a scintillator structure which can be manufactured with additive manufacturing techniques providing a variety of scintillating materials such as transparent garnets, to be deposited in a needle-like shape, which is required to obtain a high Detective Quantum Efficiency, abbreviated as DQE, which is a measure of the combined effects of the signal related to image contrast and noise performance of an imaging system, generally expressed as a function of special frequency.

The present invention advantageously allows that dimensions, for instance a total height or width, of the scintillating columns or of the scintillator structure can be easily tuned to the specific radiation attenuation properties of the scintillating material in order to obtain the desired detective quantum efficiency and the desired optical transfer function or modulation transfer function for a specific medical imaging application.

The present invention advantageously allows that the scintillator structure can be manufactured with several techniques, for instance layer-by-layer ink-jet printing of the needle structures with sintered scintillator particles or green phase scintillator particles followed by photonic sintering, whole-layer deposition of a particle-in-photosensitive binder scintillator, stereo-lithography and removal of material around structures.

According to the present invention the term aspect ratio may be defined as the following: the aspect ratio of a geometric shape is the ratio between its sizes in different dimensions. For example, the aspect ratio of a rectangle-like needle structure is the ratio of its longer side to its shorter side.

According to an exemplary embodiment of the present invention, the scintillator structures can be further manufactured by making a close layer of required thickness consisting of two sacrificial layers.

According to an exemplary embodiment of the present invention, at least one of the columnar elements comprises as the scintillating material a material selected from the group comprising caesium iodide or zinc sulphide or sodium iodide or lutetium oxyorthosilicate or bismuth germanium oxide or any other scintillating material. Particular, scintillating materials like Gadolinium oxyorthosilicate, known as GSO, may be used, which is a type of scintillating inorganic crystal used for imaging in nuclear medicine and for calorimetry or Lutetium-yttrium oxyorthosilicate, also known as LYSO, which is an inorganic chemical compound with main use as a scintillator crystal.

Further, as the scintillating material, inorganic scintillators may be used, for example, alkali metal halides, often with a small amount of activator impurity, NaI(Tl) (sodium iodide doped with thallium). Other inorganic alkali halide crystals are, for instance: CsI(Tl), CsI(Na), CsI(pure), CsF, KI(Tl), LiI(Eu). Some non-alkali crystals may include: $BaF_2$, $CaF_2(Eu)$, ZnS(Ag), CaWO4, $CdWO_4$, YAG(Ce) ($Y_3Al_5O_{12}(Ce)$).

Further, as the scintillating material, Yttrium aluminum garnet; YAG, $Y_3Al_5O_{12}$ or any other synthetic crystalline material of the garnet group or of silicate minerals may be used or any intermetallic compound or alloy or any other metallic compounds comprising a rare earth metal, as for instance, Yttrium, Cerium, Terbium, Gallium or Gadolinium.

According to an exemplary embodiment of the present invention, the first array of the plurality of columnar elements provides a ratio of a light sensitive area of the device to a total area of the device of at least 0.9, preferably at least 0.95, most preferably 1.0 as a fraction ratio. A ratio of at least 0.9, preferably at least 0.95, most preferably 1.0 is advantageously reached due to the scintillator structure comprising columnar elements with protruding portions.

In other words, the staggered needle array may cover the entire surface of the detector, enabling complete capture of perpendicularly incident X-rays or γ-rays, providing a fill factor of over 90% or 95% or of up to 100%.

According to an exemplary embodiment of the present invention, a height of at least one of the columnar elements is adjusted to an attenuation coefficient of the scintillating material of the columnar elements.

According to an exemplary embodiment of the present invention, a height of at least one of the columnar elements is adjusted to an energy of the ionizing-radiation to be converted into the light ray.

According to an exemplary embodiment of the present invention, an aspect ratio of at least one of the columnar elements, defined as ratio of height to width, is greater than 5.

According to an exemplary embodiment of the present invention, at least one of the columnar elements comprises at least two stepwise displacements along a longitudinal direction of the columnar element.

This advantageously provides an even higher fill factor of the radiation detector device.

According to an exemplary embodiment of the present invention, a first stepwise displacement of the least two stepwise displacements protrudes in a first direction and a second stepwise displacement protrudes in a second direction, wherein the first direction is differing from the second direction.

This advantageously allows structuring the columnar elements in form of staggered needles with an optimum space utilization.

The term differing direction, as used by the present invention may refer to two directions which comprise an angular deviation of more than 5° or more than 10° or in other words which are not parallel.

According to an exemplary embodiment of the present invention, the scintillator structure is configured to detect X-rays due to the radiation conversion.

According to an exemplary embodiment of the present invention the scintillator structure is configured to detect light rays due to the radiation conversion.

According to an exemplary embodiment of the present invention, the scintillator structure is producible by an additive manufacturing method.

According to an exemplary embodiment of the present invention, the preparing of the first array is performed using scintillating particles in an organic binder.

According to an exemplary embodiment of the present invention, the preparing of the first array is performed by layer-by-layer ink-jet printing or by any other additive manufacturing technique.

A more complete application of the invention and the attendant advantages thereof will be more clearly understood by reference to the following schematic drawings, which are not a scale.

FIG. 1 shows a schematic diagram of a radiation detector device according to an exemplary embodiment of the invention;

FIG. 2 shows a schematic diagram of a medical imaging system according to an exemplary embodiment of the invention;

FIG. 3 shows a schematic flow chart diagram of a method for additive manufacturing according to an exemplary embodiment of the invention.

DETAILED DESCRIPTION OF THE EMBODIMENTS

Figure 4:
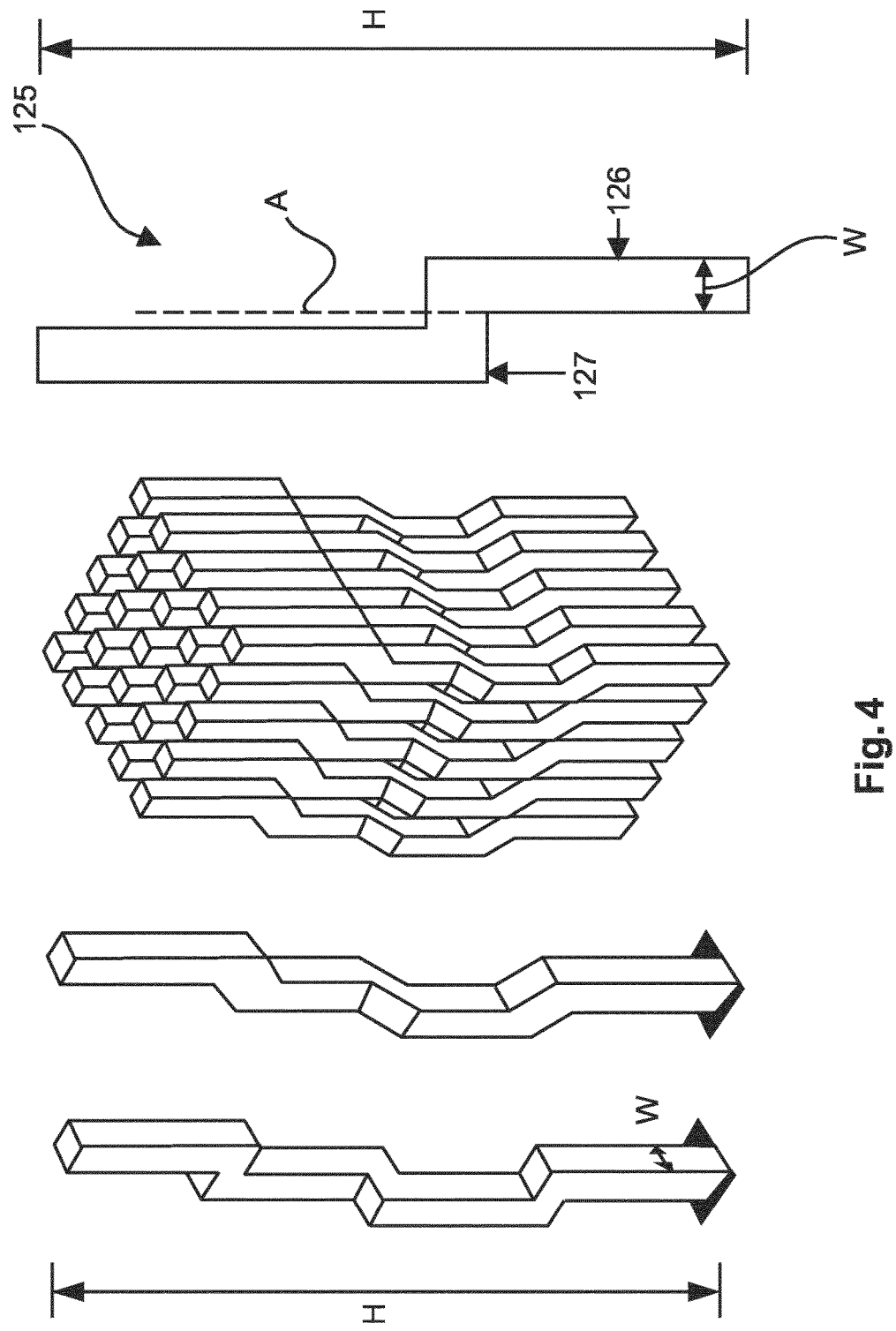
FIG. 4 shows a schematic diagram of a scintillator structure according to an exemplary embodiment of the invention.

The illustrations and drawings are purely schematically and do not intend to provide scaling relations or cite information.

In different drawings, similar or identical elements are provided for the same reference numbers. Generally, identical parts, units, entities or steps are provided with the same reference symbols in the description.

FIG. 1 shows a schematic diagram of a radiation detector device according to an exemplary embodiment of the invention. A radiation detector device 100 may comprise a readout electronic circuit 150, a scintillator structure 110 comprising a first array 120 of a plurality of columnar elements 125, and a second array 130 of a plurality of photosensitive elements 135.

The first array 120 of a plurality of columnar elements 125 may be constructed that each of the columnar elements 125 comprises a base portion 126 and a protruding portion 127, wherein the columnar elements 125 comprise a scintillating material and the columnar elements 125 are configured to generate a light ray by a radiation conversion. The radiation conversion may be any kind of ionizing-radiation-to-non-ionizing-radiation conversion. The radiation conversion may use the scintillating material that exhibits scintillation—the property of luminescence when excited by ionizing radiation. Luminescent materials or scintillating materials, when struck by an incoming particle, absorb its energy and scintillate, re-emit the absorbed energy in the form of light.

The second array 130 of a plurality of photosensitive elements 135 may be constructed that each of the photosensitive elements 135 is assigned to one of the columnar elements 125 and the photosensitive elements 135 are configured to detect the generated light ray.

FIG. 2 shows a schematic diagram of a medical imaging system according to an exemplary embodiment of the invention.

A medical imaging system 200 may comprise a device 100 for radiation detection. The radiation detector device may be used in various medical imaging systems, for instance, in X-ray computed tomography (X-ray CT), in positron emission tomography, PET, a nuclear medicine, functional imaging technique that produces a three-dimensional image of functional processes in the body, in Single-photon emission computed tomography, SPECT, or less commonly, SPET, a nuclear medicine tomographic imaging technique using gamma rays.

The radiation detector device may be used for measuring pulse X-radiation, diffracted X-Ray radiation imaging system or mammography systems or in Homeland security applications, industrial safety and/or inspection systems, non-destructive testing equipment, material characterization equipment and further detector systems.

FIG. 3 shows a schematic flow chart diagram of a method for additive manufacturing of radiation detector device according to an exemplary embodiment of the present invention.

As a first step of the method, preparing S1 a first array 120 of a plurality of columnar elements 125 is conducted.

As a second step of the method, preparing S2 a second array 130 of a plurality of photosensitive elements 135 is performed.

As a third step of the method, constructing S3 a detector device 100 comprising the first array 120 and the second array 130 is conducted.

The preparing S1 of the first array 120 may be performed by particle-in-binder deposition or by any other additive manufacturing technique.

The publication by Remi Noguera, Martine Lejeune and Thierry Chartier, 3D fine scale ceramic components formed by ink-jet prototyping process, J. European Ceramic Soc. Vol. 25, Iss. 12 (2005) 2055-2059 describes the manufacturing of lead zirconium titanate (PZT) pillar arrays using inkjet printing.

The publication by X. Zhao, J. R. G. Evans, M. J. Edirisinghe and J. H. Song, Ink-jet printing of ceramic pillar arrays, J. Materials Science Vol. 37, Iss. 10 (2002) 1987-1992 describes the manufacturing of ZrO2 ceramic pillars using ink-jet printing.

The publication by M. Lejeune, T. Chartier, C. Dossou-Yovo and R. Noguera, Ink-jet printing of ceramic micro-pillar arrays, J. European Ceramic Soc. Vol. 29, Iss. 5 (2009) 905 0 911 reviews illustrating various ceramic pillar structures made with ink-jet printing.

Inkjet-printable garnet materials are also particles in an ink. Using experience in making inks for printing ceramic particles, substituting e.g. TiO2 particles with (Gd, Ga, Lu, Ce, Al) oxide particles which are used in garnet manufacturing is feasible. The viscosity of the ink, the particle size and the particle concentration should be kept the same. The dispersant should be changed to suit the type of oxide particles used.

The preparing S1 of the first array 120 may be performed by layer-by-layer ink-jet printing or by any other additive manufacturing technique. According to a further embodiment of the present invention, stereo lithography and removal of material around structures may be used as the additive manufacturing technique for producing the radiation detector device.

The step of constructing S3 the detector device 100 may further comprise the step of coupling a read-out electronic circuit 150 to the second array 130 of the plurality of the photosensitive elements 135.

According to a further embodiment of the present invention, a closed layer of required thickness is produced comprising two sacrificial layers. The sacrificial layer made in the form of the required 3D needle shape is first removed. The openings are then filled with a transparent particle-in-binder scintillator. After hardening (thermal or UV) the second sacrificial layer is removed, revealing the 3D needle-shaped scintillator structure.

FIG. 4 shows a schematic diagram of a scintillator structure according to an exemplary embodiment of the invention.

FIG. 4 shows three-dimensional structured scintillators made in the form of an array of staggered needles with an aspect ratio >5 according to an exemplary embodiment of the invention. In the array as shown in FIG. 4, the individual staggered needles are spaced with equivalent width W and length or height H of the needles.

The needles or columnar elements 125 have a defined width W and a height H, both of these measures defining an aspect ratio of the columnar elements 125. The aspect ratio may be defined as the ratio of the longer side, for instance height H, to the shorter side, for instance width W, and the aspect ratio may be greater than 5.

This ensures that, when seen from above, the staggered needle array may cover the entire surface of the detector, enabling complete capture of perpendicularly incident X-rays or γ-rays, providing a fill factor of over 90% or 95% or of up to 100%.

The dimension of the three-dimensional structured scintillators may be a length and width W less than 150 μm and a total height H in excess of 1 mm. The height H of at least one of the columnar elements may be adjusted to an attenuation coefficient of the scintillating material of the columnar elements 125.

For instance, for an X-ray energy of 10 keV cesium iodide may have an X-Ray mass attenuation coefficient of $1.711*10^2$ cm$^2$/g leading, for instance, to a height of the three-dimensional structured scintillators of 800 μm in order to generate a sufficient amount of light photons by the incoming X-ray radiation.

For an X-ray energy of, for instance, 1 MeV, the X-Ray mass attenuation coefficient of cesium iodide may be $5.848*10^{-2}$ cm$^2$/g, since the attenuation coefficient is lower for the higher energy, the height H may be adjusted to compensate the weaker interaction of the X-rays with the scintillating material and a height of the three-dimensional structured scintillators may be set to an increased value of 1400 μm. Accordingly, the height H of at least one of the columnar elements 125 may be adjusted to an energy of the ionizing-radiation to be converted into the light ray.

The three-dimensional structured scintillators may be fabricated as columnar elements 125 which may comprise a base portion 126 and a protruding portion 127. The protruding portion 127 may be fabricated in form of at least one stepwise displacement 127 along a longitudinal direction A or boundary A of the columnar element 125.

The boundary A may be defined by a base side of the columnar element 125. In other words, the protruding portion 127 may protrude beyond the base side of the columnar element 125. The boundary A is depicted as a line or a direction A in FIG. 4, but the boundary A may be a plane or a half plane or any other geometrical element defined by boundaries of the base side or substrate plane of the columnar element 125.

According to an exemplary embodiment of the present invention, at least one of the columnar elements comprises at least two stepwise displacements along a longitudinal direction of the columnar element.

On the left side of FIG. 4, three stepwise displacements along a longitudinal direction of the columnar element are shown, a first stepwise displacement of the three stepwise displacements protrudes in a first direction and a second stepwise displacement protrudes in a second direction, wherein the first direction is differing from the second direction or the first direction is perpendicular to the second direction.

A third stepwise displacement protrudes in a third direction, wherein the third direction is perpendicular to the second direction.

The three displacements may be chamfered as shown in FIG. 4, second image from left in FIG. 4.

According to an embodiment of the present invention, the columnar element 125 may have a structure comprising no rotational symmetry, in other words the columnar element 125 may be anti-rotational symmetric or rotational-asymmetric, e.g. a rotation by an angle of 360° does not change the object, rotations with different angle than 360° would change the contour or shape of the object. The rotation may be performed along an axis perpendicular to a substrate plane, on which the structure is produced, for instance, by additive manufacturing.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A radiation detector device, comprising:
   a first array of a plurality of single piece rectangular columnar elements comprising a base portion and a protruding portion, the columnar elements comprising a scintillating material configured to generate a light ray by a radiation conversion, wherein the protruding portion comprises at least two stepwise displacements along a longitudinal direction of the columnar element, wherein a first stepwise displacement of the least two stepwise displacements protrudes in a first direction, and a second stepwise displacement protrudes in a second direction, and wherein the first direction is different from the second direction;

a second array of a plurality of photosensitive elements, wherein each of the photosensitive elements is assigned to one of the columnar elements and the photosensitive elements being configured to detect the generated light ray; and a read-out electronics circuit.

2. The radiation detector device according to claim 1, wherein at least one of the columnar elements comprises as the scintillating material a material selected from the group comprising caesium iodide or zinc sulphide or sodium iodide or lutetium oxyorthosilicate or bismuth germanium oxide.

3. The radiation detector device according to claim 1, wherein the first array of the plurality of columnar elements provides a ratio of a light sensitive area of the device to a total area of the device of at least 0.9 as a fraction ratio.

4. The radiation detector device according to claim 3, wherein a height of at least one of the columnar elements is adapted according to an attenuation coefficient of the scintillating material of the columnar elements to generate a sufficient amount of light photons by the radiation conversion.

5. The radiation detector device according to claim 1, wherein a height of at least one of the columnar elements is adapted according to an energy of ionizing-radiation to be converted into the light ray to compensate for the interaction of the ionizing-radiation with the scintillating material.

6. The radiation detector device according to claim 1, wherein an aspect ratio of at least one of the columnar elements, defined as ratio of height to width, is greater than 5.

7. The radiation detector device according to claim 1, wherein at least one of the columnar elements comprises at least two stepwise displacements along a longitudinal direction of the columnar element.

8. The radiation detector device according to claim 7, wherein a first stepwise displacement of the least two stepwise displacements protrudes in a first direction and a second stepwise displacement protrudes in a second direction, wherein the first direction is differing from the second direction.

9. The radiation detector device according to claim 8, wherein the device is configured to detect X-rays or γ-rays due to the radiation conversion.

10. The radiation detector device according to claim 9, wherein the device is producible by an additive manufacturing method.

11. A medical imaging system, comprising:

a radiation detector device comprising:

a first array of a plurality of single piece rectangular columnar elements comprising a base portion and a protruding portion, the columnar elements comprising a scintillating material configured to generate a light ray by a radiation conversion, wherein the protruding portion comprises at least two stepwise displacements along a longitudinal direction of the columnar element, wherein a first stepwise displacement of the least two stepwise displacements protrudes in a first direction and a second stepwise displacement protrudes in a second direction, and wherein the first direction is different from the second direction;

a second array of a plurality of photosensitive elements, wherein each of the photosensitive elements is assigned to one of the columnar elements and the photosensitive elements being configured to detect the generated light ray; and a read-out electronics circuit.

12. A method for producing a radiation detector device, the method comprising:

preparing a first array of a plurality of single piece rectangular columnar elements, wherein the columnar elements comprise a protruding portion having at least two stepwise displacements along a longitudinal direction of the columnar element, wherein a first stepwise displacement of the least two stepwise displacements protrudes in a first direction, and a second stepwise displacement protrudes in a second direction, and wherein the first direction is different from the second direction;

preparing a second array of a plurality of photosensitive elements; and constructing a scintillator structure comprising the first array and the second array.

13. The method according to claim 12, wherein the preparing the first array is performed by layer-by-layer ink-jet printing or by any other additive manufacturing technique.

14. The method according to claim 13, wherein the preparing the first array is performed using scintillating particles in an organic binder.

* * * * *